(12) United States Patent
Cho et al.

(10) Patent No.: US 9,798,034 B2
(45) Date of Patent: Oct. 24, 2017

(54) AIRSHIP-BASED ELECTROMAGNETIC EXPLORATION DEVICE

(71) Applicant: KOREA INSTITUTE OF GEOSCIENCE & MINERAL RESOURCES, Daejeon (KR)

(72) Inventors: Seong-Jun Cho, Daejeon (KR); Sam-Kyu Park, Daejeon (KR)

(73) Assignee: Korea Institute of Geoscience & Mineral Resources, Daejeon (KR)

( * ) Notice: Subject to any disclaimer, the term of this patent is extended or adjusted under 35 U.S.C. 154(b) by 0 days.

(21) Appl. No.: 15/122,671

(22) PCT Filed: Mar. 4, 2015

(86) PCT No.: PCT/KR2015/002075
§ 371 (c)(1),
(2) Date: Aug. 31, 2016

(87) PCT Pub. No.: WO2015/133810
PCT Pub. Date: Sep. 11, 2015

(65) Prior Publication Data
US 2017/0068013 A1    Mar. 9, 2017

(30) Foreign Application Priority Data
Mar. 4, 2014  (KR) .................. 10-2014-0025679

(51) Int. Cl.
*G01V 3/16*     (2006.01)
*G01V 3/165*    (2006.01)
(52) U.S. Cl.
CPC ............ *G01V 3/16* (2013.01); *G01V 3/165* (2013.01)
(58) Field of Classification Search
CPC ............ G01V 3/104; G01R 33/3657; E21B 2041/0028
See application file for complete search history.

(56) References Cited

U.S. PATENT DOCUMENTS

| | | | | |
|---|---|---|---|---|
| 5,883,515 A | * | 3/1999 | Strack .................. | G01V 3/28 324/339 |
| 2009/0284258 A1 | | 11/2009 | Morrison et al. | |

(Continued)

FOREIGN PATENT DOCUMENTS

| | | |
|---|---|---|
| KR | 100974484 B1 | 8/2010 |
| WO | 2012051676 A1 | 4/2012 |

OTHER PUBLICATIONS

International Search Report re PCT/KR2015/002075, dated Jun. 22, 2015.

*Primary Examiner* — Giovanni Astacio-Oquendo
*Assistant Examiner* — Alvaro Fortich
(74) *Attorney, Agent, or Firm* — Caesar Rivise, PC

(57) ABSTRACT

An electromagnetic exploration device minimizes signal interference due to a metal body or electronic components that constitute an air vehicle by installing a transmission coil and a receiving coil in an envelope of an airship, and enables a batch arrangement of the optimized transmission coil and receiving coil in accordance with various exploration purposes using the envelope shape, thereby acquiring exploration data from one flight. The device in an airship having an envelope includes: a transmission coil along the periphery of the horizontal axial direction of the envelope, for generating a primary magnetic field; at least one receiving coil along the periphery of the envelope, for detecting a secondary magnetic field induced by the primary magnetic field; and an analyzing device for applying an electric current to the receiving coil and analyzing a measurement value of the secondary magnetic field detected by the receiving coil, thereby performing air electromagnetic exploration.

7 Claims, 6 Drawing Sheets

(56) References Cited

U.S. PATENT DOCUMENTS

2011/0181290 A1\* 7/2011 Kuzmin .................. G01V 3/17
　　　　　　　　　　　　　　　　　　　　　　324/331
2011/0304220 A1\* 12/2011 Whitehead ............. H01F 21/08
　　　　　　　　　　　　　　　　　　　　　　307/104

\* cited by examiner (a)

(b)

(a)

(b)

(a)

(b)

(a)

(b)

(a)

(b)

AIRSHIP-BASED ELECTROMAGNETIC EXPLORATION DEVICE

FIELD OF THE DISCLOSURE

The present invention relates to an airship-based electromagnetic survey apparatus, and more particularly, to an airship-based electromagnetic survey apparatus that includes a transmission coil and a reception coil disposed on an envelope of the airship so as to minimize signal interference due to a metal body constituting the airship and various electronic components while allowing placement of the transmission coil and the reception coil to be optimized for various survey purposes by the shape of the envelope such that various survey data can be acquired in just one flight.

BACKGROUND

Conventionally, an underground survey has been conducted by an electromagnetic (EM) method or a magnetotelluric (MT) method.

In the EM method, an alternating current is allowed to flow through a transmission loop coil facing the ground to generate a primary magnetic field, and a secondary magnetic field induced by an eddy current generated under the ground due to the primary magnetic field is observed through a reception coil to measure electrical resistivity of the ground.

In the MT method, variations of an electric field and a magnetic field due to underground electromagnetic induction are observed through a grounded electrode and a reception coil, thereby measuring electrical resistivity of the ground. Although both methods are underground survey methods using electromagnetic induction, the EM method employs electrodes not buried in the ground. Another example of a method of estimating a distribution of electrical resistivity using an embedded electrode can include an electrical resistivity survey method. Such an EM method can provide easy measurement and is widely used to estimate a distribution of electrical resistivity under the ground.

In the EM method, a loop coil is carried by a person such that an underground survey can be easily conducted at lower cost. In addition, the EM method is little affected by topography and thus can easily determine two-dimensional diffusion and depth-wise variation of an electrical resistivity distribution, thereby allowing a three-dimensional survey.

However, the EM method is unsuitable for carrying out a wide-ranging underground survey despite the advantage of allowing an easy underground survey. Thus, there has been proposed a multi-frequency airborne electromagnetic method (for example, helicopter-borne electromagnetic method) wherein a loop coil is towed by a helicopter or the like. In this method, an alternating current is allowed to flow through a loop coil in the air such that a distribution of electrical resistivity under the ground can be measured using electromagnetic induction that occurs when an AC magnetic field moves under the ground.

Such an airborne electromagnetic survey is performed using a fixed-wing aircraft as shown in FIG. 2 or a rotary-wing aircraft as shown in FIG. 2 which flies along a predetermined flight path with an electromagnetic survey apparatus installed therein, and is essentially used in discovering overseas metal mineral resources due to effectiveness thereof in finding metal ores buried deep underground.

In a fixed-wing aircraft as shown in FIG. 1, electromagnetic waves are transmitted/received using a transmission coil disposed on the wings and fuselage and a reception coil placed under the aircraft, whereas, in a rotary-wing aircraft as shown in FIG. 2, electromagnetic waves are transmitted/received using a transmission coil and a reception coil each placed under the aircraft.

However, such an airborne electromagnetic survey is based on a high-priced fixed-wing aircraft or rotary-wing aircraft and is thus very costly. In addition, since it is very difficult and dangerous to add coils to a fixed wing of an aircraft designed to have an elaborate lift structure for stable flight, addition of coils to an aircraft not dedicated to an electromagnetic survey and use of such an aircraft in an electromagnetic survey are not preferred. Further, an electromagnetic survey using a rotary-wing aircraft also has a problem in that the aircraft should fly at low altitude with a bulky coil structure suspended therefrom, causing safety risks.

Particularly, in an airborne electromagnetic survey using a fixed-wing aircraft or a rotary-wing aircraft, a transmission coil and a reception coil are mainly disposed on the fuselage of an aircraft. Thus, signal interference often occurs due to a metal body constituting the fuselage or various electronic components during transmission/reception of electromagnetic waves, causing deterioration in reliability of measurement results.

In addition, when an aircraft designed to have a highly elaborate lift structure is used, placement or addition of a transmission coil and a reception coil is restricted. Thus, there is an efficiency problem in that it is necessary to fly the same course repeatedly with the transmission coil and the reception coil repositioned or added each time, depending on the purpose of a survey.

The present invention has been conceived to solve such problems in the art and it is an object of the present invention to provide an airship-based electromagnetic survey apparatus that includes a transmission coil and a reception coil disposed on an envelope of the airship so as to minimize signal interference due to a metal body constituting the airship and various electronic components while allowing placement of the transmission coil and the reception coil to be optimized for various survey purposes by the shape of the envelope such that various survey data can be acquired in just one flight.

BRIEF SUMMARY

In accordance with one aspect of the present invention, an airship-based electromagnetic survey apparatus provided to an airship having an envelope includes: a transmission coil disposed along a circumference of the envelope in a horizontal axis direction of the envelope and generating a primary magnetic field; at least one reception coil disposed along the circumference of the envelope and detecting a secondary magnetic field induced by the primary magnetic field; and an analyzer performing an airborne electromagnetic survey by applying electric current to the reception coil and analyzing measurements of the secondary magnetic field detected by the reception coil.

Preferably, the analyzer includes a magnetic field generator generating the primary magnetic field by applying an alternating current to the transmission coil; a magnetic field detector detecting the secondary magnetic field from the reception coil; an analysis unit measuring and analyzing the secondary magnetic field transferred from the magnetic field detector; and a storage unit storing analysis results of the analysis unit.

Preferably, the reception coil includes a horizontal coil disposed along the circumference of the envelope in the horizontal axis direction and measuring a vertical component of the secondary magnetic field.

Preferably, the reception coil includes a vertical coil disposed along a circumference of the envelope in a vertical axis direction of the envelope and measuring a horizontal component of the secondary magnetic field.

Preferably, the vertical coil includes a first vertical coil and a second vertical coil disposed at a distance from each other along the circumference of the envelope in the vertical axis direction; the magnetic field detector includes a first magnetic field detector and a second magnetic field detector detecting the secondary magnetic field from the first vertical coil and the second vertical coil, respectively; and the analysis unit analyzes a difference between measurements of the secondary magnetic field detected by the first magnetic field detector and the second magnetic field detector to survey a response of conductors buried at a shallow depth.

Preferably, the reception coil includes a horizontal coil disposed along the circumference of the envelope in the horizontal axis direction and measuring a vertical component of the secondary magnetic field and a vertical coil disposed along the circumference of the envelope in a vertical axis direction of the envelope and measuring a horizontal component of the secondary magnetic field; the magnetic field detector includes a third magnetic field detector and a first magnetic field detector detecting the secondary magnetic field from the horizontal coil and the vertical coil, respectively; and the analysis unit estimates a vector of the secondary magnetic field based on measurements of the secondary magnetic field detected by the third magnetic field detector and the first magnetic field detector.

Preferably, the reception coil includes a horizontal coil disposed along the circumference of the envelope in the horizontal axis direction and measuring a vertical component of the secondary magnetic field; and a first vertical coil and a second vertical coil disposed at a distance from each other along the circumference of the envelope in a vertical axis direction of the envelope, the magnetic field detector includes: a third magnetic field detector detecting the secondary magnetic field from the horizontal coil; and a first magnetic field detector and a second magnetic field detector detecting the secondary magnetic field from the first vertical coil and the second vertical coil, respectively, and the analysis unit estimates a vector of the secondary magnetic field based on measurements of the secondary magnetic field detected by the first, second, and third magnetic field detectors and analyzes a difference between measurements of the secondary magnetic field detected by the first magnetic field detector and the second magnetic field detector to survey a response of conductors buried at shallow depths.

According to the present invention, it is possible to provide an airship-based electromagnetic survey apparatus which includes a transmission coil and a reception coil disposed on an envelope of the airship such that signal interference due to a metal body constituting the airship and various electronic components can be minimized while allowing placement of the transmission coil and the reception coil to be optimized for various survey purposes by the shape of the envelope such that various survey data can be acquired in just one flight.

Specifically, in the airship-based electromagnetic survey apparatus according to the present invention, a transmission coil and a reception coil are mounted on an envelope of an airship, whereby signal interference due to a metal body constituting the fuselage or various electronic components can be minimized during transmission/reception of electromagnetic waves, thereby improving reliability of measurement results, as compared with an airborne electromagnetic survey using a fixed-wing aircraft or a rotary-wing aircraft.

In addition, in the airship-based electromagnetic survey apparatus according to the present invention, a transmission coil and a reception coil are securely attached to an envelope, whereby the geometry, relative position, and tilt angle of the transmission coil and the reception coil can be precisely known during analysis, thereby allowing accurate data interpretation.

When an aircraft designed to have a highly elaborate lift structure is used, placement or addition of a transmission coil and a reception coil is restricted. Thus, it is necessary to fly the same course repeatedly with the transmission coil and the reception coil repositioned or added each time, depending on the purpose of a survey. Conversely, the airship-based electromagnetic survey apparatus according to the present invention allows placement of a transmission coil and a reception coil to be optimized for various survey purposes by the shape of an envelope, whereby various survey data can be acquired in just one flight.

Further, the electromagnetic survey apparatus according to the present invention can considerably reduce survey costs as compared with typical electromagnetic survey apparatuses based on high-priced fixed-wing aircraft or rotary-wing aircraft, and allows a transmission coil and a reception coil to be easily placed or mounted while reducing the risk of crash and flight hazards, as compared with typical electromagnetic survey apparatuses based on high-priced fixed-wing aircraft or rotary-wing aircraft, thereby improving safety of an airborne survey.

DETAILED DESCRIPTION

Figure 1:
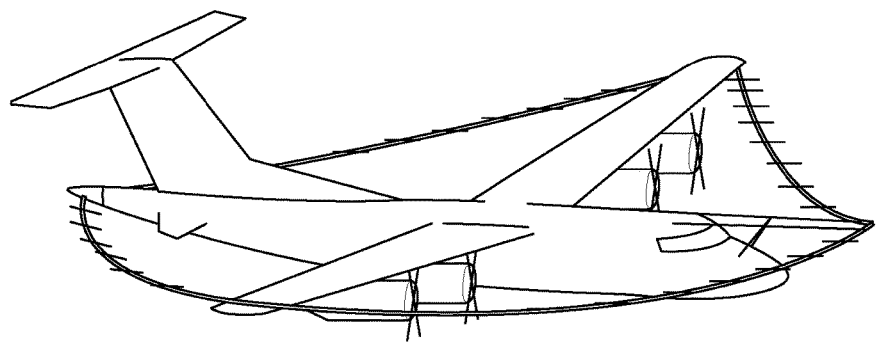
FIG. 1 is a view illustrating an electromagnetic survey using a fixed-wing aircraft among typical airborne electromagnetic survey methods.
Figure 2:
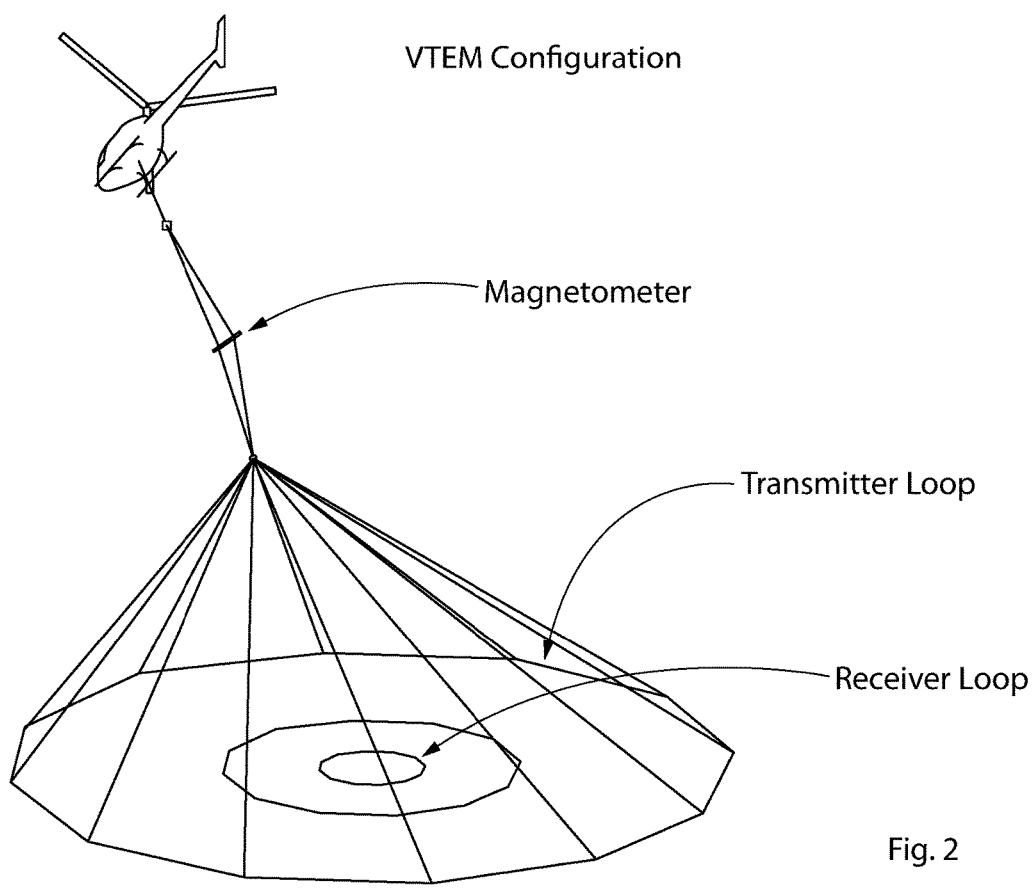
FIG. 2 is a view illustrating an electromagnetic survey using a rotary-wing aircraft among typical airborne electromagnetic survey methods.

Hereinafter, embodiments of the present invention will be described with reference to the accompanying drawings. It should be noted that like components will be denoted by like reference numerals throughout the specification and the accompanying drawings. In addition, descriptions of details apparent to those skilled in the art will be omitted for clarity.

FIGS. 3 to 7 are views illustrating various embodiments of an airship-based electromagnetic survey apparatus according to the present invention.

An electromagnetic survey apparatus according to the present invention is installed and operated in an airship 100 and, more specifically, includes: a transmission coil 210 and a reception coil 220 each disposed along an outer circumference of an envelope 110; and an analyzer 300 connected to the transmission coil 210 and the reception coil 220 and disposed in a gondola 130. The electromagnetic survey apparatus transmits/receives electromagnetic waves through the transmission coil 210 and the reception coil 220 during flight of the airship 100 along a predetermined flight path to acquire various survey data based on the measured electromagnetic waves.

The airship 100 gains lift from a large bag filled with a gas having lower specific gravity than air to navigate through the air. Herein, the airship 100 may include manned airships operated by a crew on board and unmanned airships operated by radio control (R/C) on the ground without a person on board.

The airship 100 includes: a voluminous envelope 110 filled with a buoyant gas (for example, helium, hydrogen, and the like); and a gondola 130 attached under the envelope, wherein the gondola is provided with a flight deck or a cockpit when the airship is a manned airship, and the gondola is provided with a propulsion device, a steering device, and a receiver for receiving radio waves through radio control on the ground when the airship is an unmanned airship.

The airship 100 flies over a survey area while maintaining a consistent altitude and speed.

The envelope 110 has a streamlined shape to reduce air resistance and may be divided into a soft envelope and a hard envelope. A soft envelope is only composed of a spindle-shaped frameless bag, and a hard envelope is assembled using a light metal frame and an outer panel such that a lot of separate gas bags or gas containers are present inside the envelope. When the envelope is a hard envelope, a propulsion device may be directly mounted on the envelope. Although not shown, the inside of a soft envelope may also be divided into a plurality of air bags each filled with a buoyant gas.

Such an airship 100 has greater cruising capacity than fixed-wing aircraft or rotary-wing aircraft, is operable at relatively low cost, as compared with typical aircraft, and is useful in electromagnetic surveys.

The envelope 100 has a streamlined shape in a generally longitudinal direction thereof to reduce drag and may be connected at the tail thereof to a rudder 120 for steering the airship. Here, the rudder 120 may have across shape composed of a vertical stabilizer and a horizontal stabilizer coupled to the tail of the envelope in vertical and horizontal directions, respectively. However, it should be understood that the rudder may have various shapes other than across shape, such as a Y-shape, depending on applications thereof.

As such, the electromagnetic survey apparatus based on the airship 100 according to the present invention can considerably reduce survey costs as compared with typical electromagnetic survey apparatuses based on high-priced fixed-wing aircraft or rotary-wing aircraft while reducing the risk of crash to improve safety of an airborne survey.

The transmission coil 210 and the reception coil 220 are disposed on the envelope 110 of the airship 100, and the analyzer 300 connected to the transmission coil 210 and the reception coil 220 is disposed in the gondola 130.

That is, the electromagnetic survey apparatus according to the present invention may include: the transmission coil 210 disposed along a circumference of the envelope 110 in a horizontal axis direction of the envelope and generating a primary magnetic field; at least one reception coil 220 disposed along the circumference of the envelope 110 and detecting a secondary magnetic field induced by the primary magnetic field; and an analyzer 300 applying electric current to the reception coil 220 and analyzing measurements of the secondary magnetic field detected from the reception coil 220 to perform an airborne electromagnetic survey.

The transmission coil 210 and the reception coil 220 may be attached to an inner or outer portion of an outer cover of the envelope 110. Herein, the term "attached" means that the transmission coil 210 and the reception coil 220 are securely mounted on the envelope 110 without deterioration in electromagnetic wave transmission/reception functions. For example, the transmission coil 210 and the reception coil 220 may be attached to the envelope 110 through adhesion, stapling, sewing, welding, or the like.

Since the transmission coil 210 and the reception coil 220 are directly attached to the envelope 110, it is possible to minimize signal interference due to a metal body constituting a fuselage or various electronic components during transmission/reception of electromagnetic waves, thereby improving reliability of measurement results.

In addition, since the transmission coil 210 and the reception coil 220 are securely mounted on the envelope 110, it is possible to precisely know the geometry, relative position, and tilt angle of the transmission coil 210 and the reception coil 220 during analysis, thereby allowing accurate data interpretation.

When an aircraft designed to have a highly elaborate lift structure is used, the transmission coil 210 and the reception coil 220 cannot be freely mounted on or added to the structure of the aircraft. Thus, it is necessary to fly the same course repeatedly with the transmission coil 210 and the reception coil 220 repositioned or added each time, depending on the purpose of a survey. Conversely, the electromagnetic survey apparatus according to the present invention can acquire various survey data in just one flight, since placement of the transmission coil 210 and the reception coil 220 can be optimized for the purpose of a survey by the shape of the envelope 110.

The analyzer 300 may be disposed in the gondola 130 of the airship 100 and connected to the transmission coil 210 and the reception coil 220 to transmit/receive electromagnetic waves through the transmission coil 210 and the reception coil 220, thereby acquiring various survey data based on the measured electromagnetic waves.

For this purpose, the analyzer 300 may include: a magnetic field generator 310 generating the primary magnetic field by applying an alternating current to the transmission coil 210; a magnetic field detector 320 detecting the secondary magnetic field from the reception coil 220; an analysis unit 370 measuring and analyzing the secondary magnetic field transferred from the magnetic field detector 320; a storage unit 380 storing analysis results of the analysis unit 370; a power supply 360 supplying electric power for device operation; and a controller 350 controlling the above components.

Next, various embodiments of the airship-based electromagnetic survey apparatus including the transmission coil 210 and the reception coil 220 each disposed on the envelope 110 of the airship 100, and various operations of the analyzer 300 connected to the transmission coil 210 and the reception coil 220 according to the embodiments will be described.

First Embodiment

Figure 3:
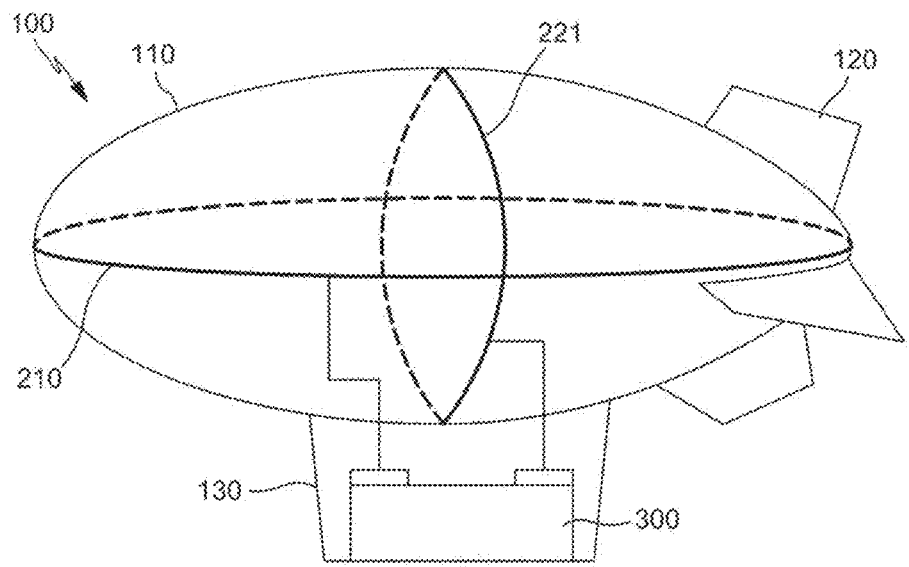
FIGS. 3 to 7 are views illustrating various embodiments of an airship-based electromagnetic survey apparatus according to the present invention.
Figure 3:
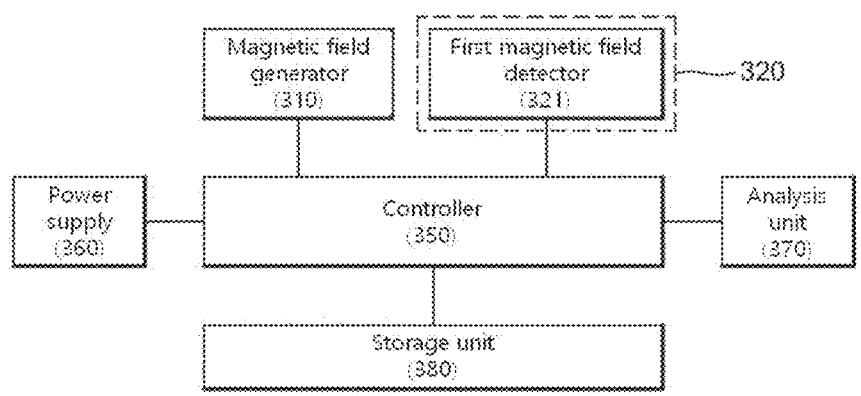

FIG. 3 shows an airship-based electromagnetic survey apparatus (a) according to a first embodiment of the present invention and an analyzer (b) of the same.

Referring to FIG. 3(a), the transmission coil 210 is disposed along the circumference of the envelope 110 of the airship 100 in the horizontal axis direction of the envelope, and, as the reception coil 220, a first vertical coil 221 is disposed along the circumference of the envelope 110 in a vertical axis direction of the envelope. Each of the transmission coil 210 and the reception coil 220 is connected to the analyzer 300 disposed in the gondola 130 through a signal cable. Although the first vertical coil 221 is shown as being disposed along a circumference of a middle portion of the envelope 110 in the vertical axis direction, it should be understood that the present invention is not limited thereto and the first vertical coil may be disposed in a circumferential surface of any portion of the envelope other than the middle portion in the vertical axis direction.

Here, the magnitude of a primary magnetic field used as a transmission source is proportional to the number of turns and area of the transmission coil 210. Thus, the number of turns of the transmission coil 210 may be increased to enhance output of the transmission source. In addition, as the transmission coil 210 is disposed along a horizontal circumference of the voluminous envelope 110 filled with a buoyant gas, the surface area of the transmission coil 210 can be naturally increased. It should be understood that the effect due to increase in area of the transmission coil 210 using the shape of the envelope 110 also applies to the reception coil 220.

Although a horizontal coil 223 measuring a vertical component of a magnetic field is generally used as the reception coil 220, vertical coils 221, 222 measuring a horizontal component of a magnetic field may be advantageously used, as needed. In addition, although only the first vertical coil 221 is attached to the envelope 110 in the first embodiment, it will be apparent from other embodiments that various combinations of the reception coil using the shape of the envelope 110 are possible.

Referring to FIG. 3(b), the analyzer 300 includes a magnetic field generator 310 generating a primary magnetic field by applying an alternating current to the transmission coil 210; and a first magnetic field detector 321, as the magnetic field detector 320 detecting a secondary magnetic field from the first vertical coil 221, which is the reception coil 221. A power supply 360 serves to supply an alternating current to the transmission coil 210 while supplying electric power for device operation.

Thus, the magnetic field generator 310 allows an alternating current to flow through the transmission coil 210 facing the ground to generate the primary magnetic field, and the first magnetic field detector 321 detects the secondary magnetic field induced by an eddy current generated under the ground due to the primary magnetic field through the first vertical coil 221, which is the reception coil 220.

The detected secondary magnetic field is transferred to an analysis unit 370, and the analysis unit 370 analyzes the secondary magnetic field transferred from the first magnetic field detector 321 to perform an underground survey including measurement of electrical resistivity of the ground.

An electromagnetic survey is an engineering endeavor to discover subterranean conductors or ores through measurement of a magnetic field. The intensity and phase of a magnetic field vary depending on underground electrical properties such as electrical resistivity. When electromagnetic waves propagated through an underground medium encounter an anomalous object having different electromagnetic properties, an eddy current is induced in the anomalous object. The analysis unit 370 measures the intensity and phase of a secondary magnetic field generated by the induced eddy current to acquire information on underground anomalous objects and geological structures. Such an electromagnetic survey is very effective in finding metal ores buried deep underground and is essentially used in discovering metal mineral resources.

Here, the secondary magnetic field generated by underground conductors points in a particular direction, and the first vertical coil 221, which is the reception coil 220, is disposed in a direction perpendicular to the ground to detect a secondary magnetic field pointing in a horizontal direction.

Particularly, in the first embodiments, the analysis unit 370 may analyze information on a horizontal distribution of underground electrical resistivity using the first vertical coil 221 measuring a horizontal component of a magnetic field.

Results of analyzing a horizontal component of the secondary magnetic field generated by underground conductors by the analysis unit 370 are stored in a storage unit 380.

Second Embodiment

Figure 4:
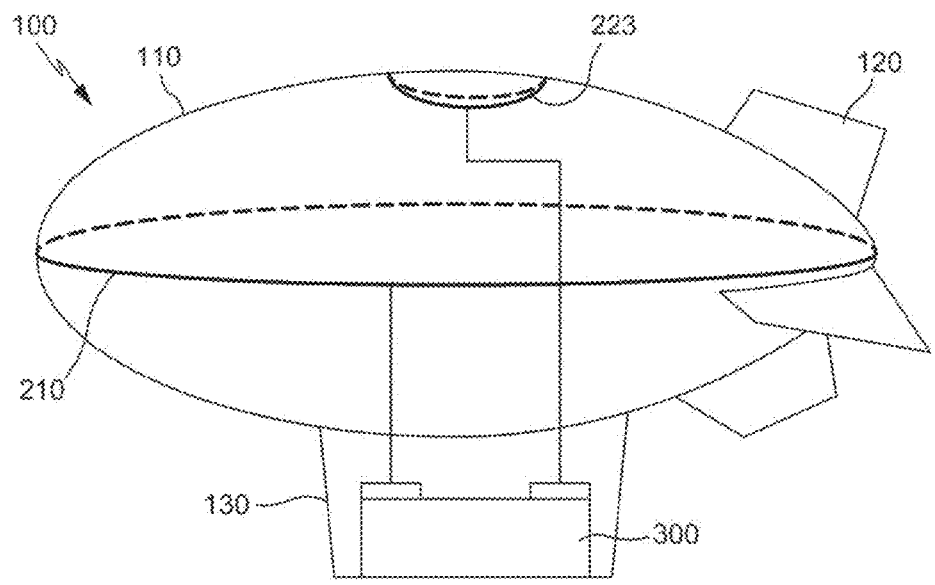
Figure 4:
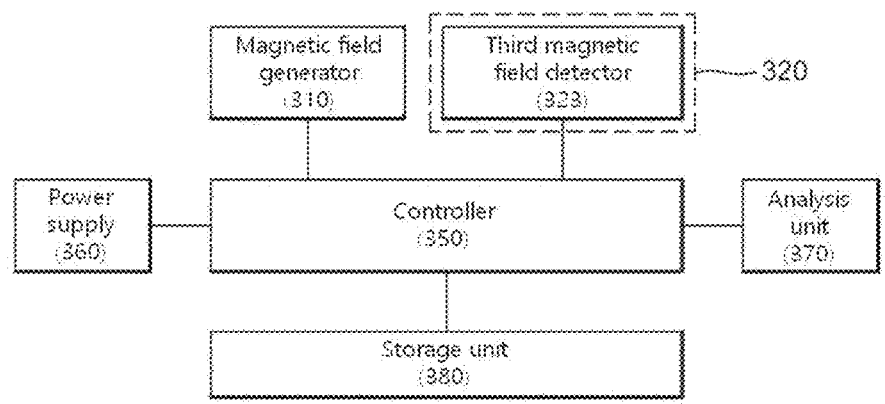

FIG. 4 shows an airship-based electromagnetic survey apparatus (a) according to a second embodiment of the present invention and an analyzer (b) of the same.

Referring to FIG. 4(a), the transmission coil 210 is disposed along the circumference of the envelope 110 of the airship 100 in the horizontal axis direction of the envelope 110, and, as the reception coil 220, a horizontal coil 223 is disposed along the circumference of the envelope 110 in the horizontal axis direction. Each of the transmission coil 210 and the reception coil 220 is connected to the analyzer 300 disposed in the gondola 130 through a signal cable. Although the horizontal coil 221 is shown as being disposed along a circumference of an upper portion of the envelope 110 in the horizontal axis direction, it should be understood that the present invention is not limited thereto and the horizontal coil may be disposed along a circumference of any portion of the envelope 110 other than the upper portion in the horizontal axis direction.

Since details of the transmission coil 210 are described above, a repeated description thereof will be omitted. The airship-based electromagnetic survey apparatus according to this embodiment is different from the first embodiment in that, as the reception coil 220, the horizontal coil 223 is disposed along a circumference of the envelope 110 in a horizontal axis direction of the envelope to detect a vertical magnetic field.

Referring to FIG. 4(b), the analyzer 300 includes a magnetic field generator 310 generating a primary magnetic field by applying an alternating current to the transmission coil 210; and a third magnetic field detector 323, as the magnetic field detector 320 detecting a secondary magnetic field from the horizontal coil 223, which is the reception coil 221. A power supply 360 serves to supply an alternating current to the transmission coil 210 while supplying electric power for device operation.

Thus, the magnetic field generator 310 allows an alternating current to flow through the transmission coil 210 facing the ground to generate the primary magnetic field, and the third magnetic field detector 323 detects the secondary magnetic field induced by an eddy current generated under the ground due to the primary magnetic field through the horizontal coil 223, which is the reception coil 220.

The detected secondary magnetic field is transferred to an analysis unit 370, and the analysis unit 370 analyzes the secondary magnetic field transferred from the third magnetic field detector 323 to perform an underground survey including measurement of electrical resistivity of the ground.

Here, the secondary magnetic field generated by underground conductors points in a particular direction, and the horizontal coil 221, which is the reception coil 220, is disposed in a direction parallel to the ground so as to detect a secondary magnetic field pointing in a vertical direction.

Particularly, in the second embodiment, the analysis unit 370 may analyze information on a vertical distribution of underground electrical resistivity using the horizontal coil 221 measuring a vertical component of a magnetic field.

Results of analyzing a vertical component of the secondary magnetic field generated by underground conductors by the analysis unit 370 are stored in a storage unit 380.

Third Embodiment

Figure 5:
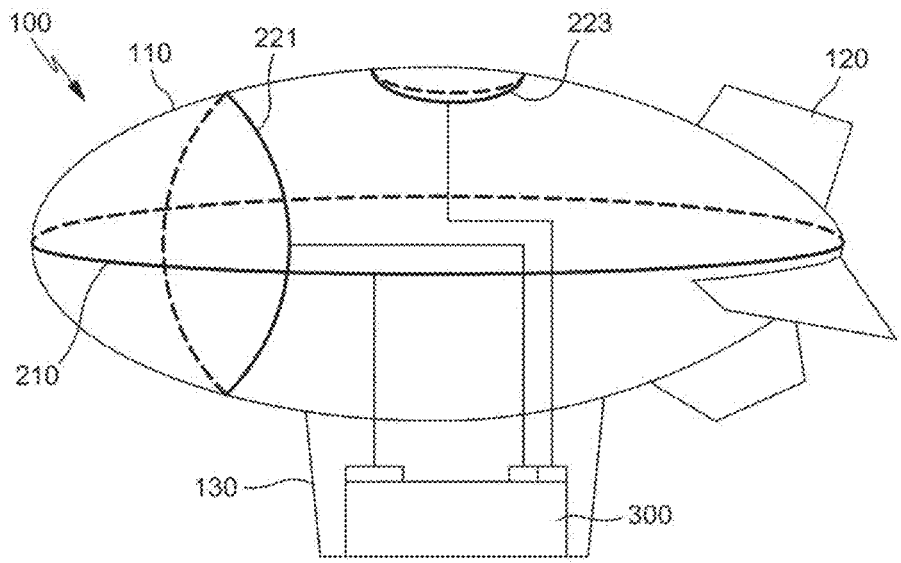
Figure 5:
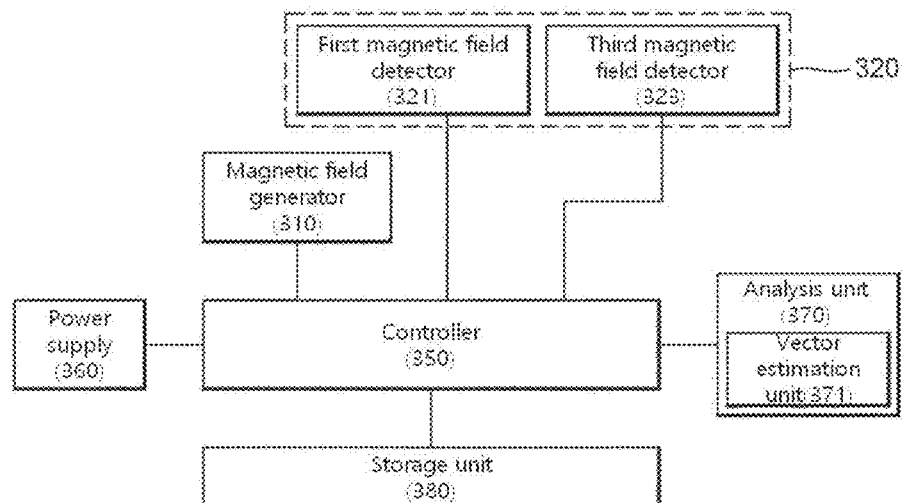

FIG. 5 shows an airship-based electromagnetic survey apparatus (a) according to a third embodiment of the present invention, and an analyzer (b) of the same.

Referring to FIG. 5(a), the transmission coil 210 is disposed along the circumference of the envelope 110 of the airship 100 in the horizontal axis direction of the envelope 110. In addition, as the reception coil 220, a horizontal coil 223 is disposed along the circumference of the envelope 110 in the horizontal axis direction, and, as the reception coil 220, a first vertical coil 221 is disposed along the circumference of the envelope 110 in the vertical direction of the envelope. Each of the transmission coil 210 and the reception coil 220 is connected to the analyzer 300 disposed in the gondola 130 through a signal cable.

Since details of the transmission coil 210 are described above, a repeated description thereof will be omitted. The airship-based electromagnetic survey apparatus according to this embodiment is different from the first and second embodiments in that, as the reception coil 220, the horizontal coil 223 is disposed along the circumference of the envelope 110 in the horizontal axis direction of the envelope and, as another reception coil 220, the first vertical coil 221 is disposed along the circumference of the envelope 110 in the vertical axis direction of the envelope so as to detect a vertical magnetic field and a horizontal magnetic field at the same time.

Referring to FIG. 5(b), the analyzer 300 includes a magnetic field generator 310 generating a primary magnetic field by applying an alternating current to the transmission coil 210; and first and third magnetic field detectors 321, 323 detecting a secondary magnetic field from the first reception coil 221 and the horizontal coil 223, which are the reception coil 221. A power supply 360 serves to supply an alternating current to the transmission coil 210 while supplying electric power for device operation.

Thus, the magnetic field generator 310 allows an alternating current to flow through the transmission coil 210 facing the ground to generate a primary magnetic field, and the first and third magnetic field detectors 321, 323 detect a secondary magnetic field induced by an eddy current generated under the ground due to the primary magnetic field through the first vertical coil 221 and the horizontal coil 223, both of which are the reception coils 220, respectively.

The detected secondary magnetic field is transferred to an analysis unit 370, and the analysis unit 370 analyzes the secondary magnetic field transferred from the first and third magnetic field detectors 321, 323 to perform an underground survey including measurement of electrical resistivity of the ground.

Here, the secondary magnetic field generated by underground conductors points in a particular direction, and the horizontal coil 223 and the first vertical coil 221, which are the reception coil 220, are disposed in a direction parallel to the ground and in a direction perpendicular to the ground, respectively, so as to detect a horizontal secondary magnetic field and a vertical secondary magnetic field at the same time.

Particularly, in the third embodiment, the analysis unit 370 may simultaneously analyze information on vertical and horizontal distributions of underground electrical resistivity using the horizontal coil 223 measuring a vertical component of a magnetic field and the first vertical coil 221 measuring a horizontal component of the magnetic field.

In addition, in the third embodiment, a vector estimation unit 371 of the analysis unit 370 may estimate a vector of the secondary magnetic field based on measurements of vertical and horizontal components of the magnetic field detected through the horizontal coil 223 and the first vertical coil 221.

Results of analyzing vertical and horizontal components of the secondary magnetic field generated by underground conductors by the analysis unit 370 and results of estimating a vector of the secondary magnetic field by the analysis unit are stored in a storage unit 380.

Fourth Embodiment

Figure 6:
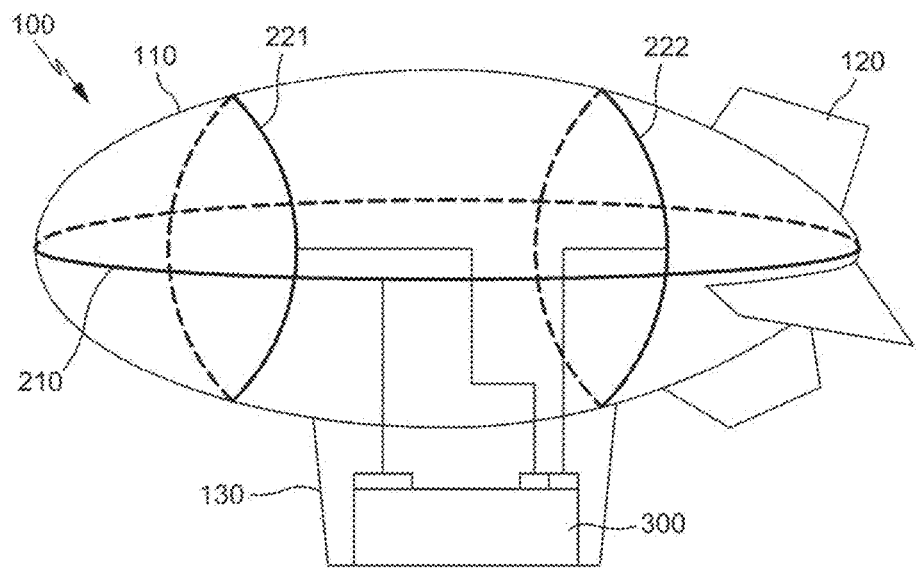
Figure 6:
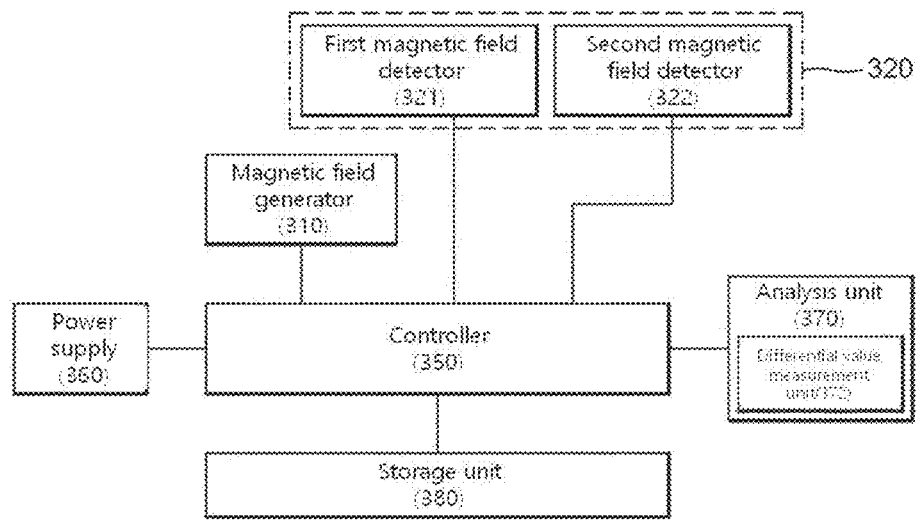

FIG. 6 shows an airship-based electromagnetic survey apparatus (a) according to a fourth embodiment of the present invention, and an analyzer (b) of the same.

Referring to FIG. 6(a), the transmission coil 210 is disposed along the circumference of the envelope 110 of the airship 100 in the horizontal axis direction of the envelope 110. In addition, as the reception coil 220, a first vertical coil 221 and a second vertical coil 222 are disposed at a distance from each other along a circumference of the envelope 110 in the vertical axis direction of the envelope 110. Each of the transmission coil 210 and the reception coil 220 is connected to the analyzer 300 disposed in the gondola 130 through a signal cable.

Since details of the transmission coil 210 are described above, a repeated description thereof will be omitted. The airship-based electromagnetic survey apparatus according to this embodiment is different from the above embodiments in that, as the reception coil 220, the first vertical coil 221 and the second vertical coil 222 are disposed at a distance from each other along a circumference of the envelope 110 in the vertical axis direction so as to detect a horizontal magnetic field that can be measured as different values.

Referring to FIG. 6(b), the analyzer 300 includes a magnetic field generator 310 generating a primary magnetic field by applying an alternating current to the transmission coil 210; and first and second magnetic field detectors 321, 322, as the magnetic field detector 320 detecting a secondary magnetic field from the first vertical coil 221 and the second vertical coil 222, which are the reception coil 221. A power supply 360 serves to supply an alternating current to the transmission coil 210 while supplying electric power for device operation.

Thus, the magnetic field generator 310 allows an alternating current to flow through the transmission coil 210 facing the ground to generate a primary magnetic field, and the first and second magnetic field detectors 321, 322 detect a secondary magnetic field induced by an eddy current generated under the ground due to the primary magnetic field through the first vertical coil 221 and the second vertical coil 222, which are the reception coil 220.

The detected secondary magnetic field is transferred to an analysis unit 370, and the analysis unit 370 analyzes the secondary magnetic field transferred from the first and second magnetic field detectors 321, 322 to perform an underground survey including measurement of electrical resistivity of the ground.

Here, the secondary magnetic field generated by underground conductors points in a particular direction, and the first vertical coil 221 and the second vertical coil 222, which are the reception coil 220, are disposed in a direction parallel to the ground so as to detect vertical secondary magnetic fields at the same time.

Particularly, in the fourth embodiment, the analysis unit 370 may analyze information on a horizontal distribution of underground electrical resistivity using the first vertical coil 221 and the second vertical coil 222 disposed at a distance from each other and measuring a horizontal component of a magnetic field.

Since the first vertical coil 221 and the second vertical coil 222 are spaced apart from each other, differential measurement of a horizontal component of a magnetic field is possible. In other words, since a response of conductors buried deep underground to the primary magnetic field is equally measured by the two vertical coils, a difference between the measurements obtained by the two vertical coils is zero, whereas, since a response of conductors buried at shallow depth to the primary magnetic field is differently measured by the two vertical coils, the differential value is not zero.

Thus, in the fourth embodiment, a differential value measurement unit 372 of the analysis unit 370 analyzes a difference between measurements of a horizontal component of the magnetic field detected by the first vertical coil 221 and the second vertical coil 222, such that a response of conductors buried at shallow depth to the primary magnetic field can be analyzed.

Results of analyzing a horizontal component of the secondary magnetic field generated by underground conductors by the analysis unit 370 and results of analyzing a response of conductors buried at shallow depth by the analysis unit are stored in a storage unit 380.

Fifth Embodiment

Figure 7:
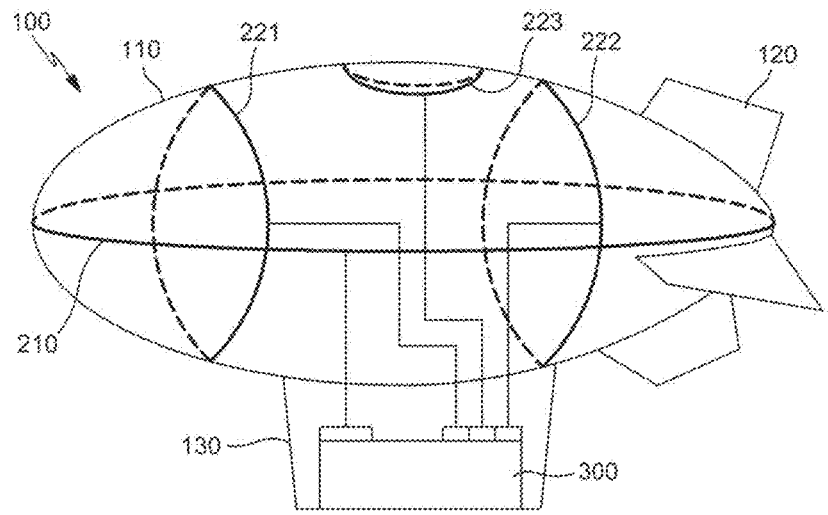
Figure 7:
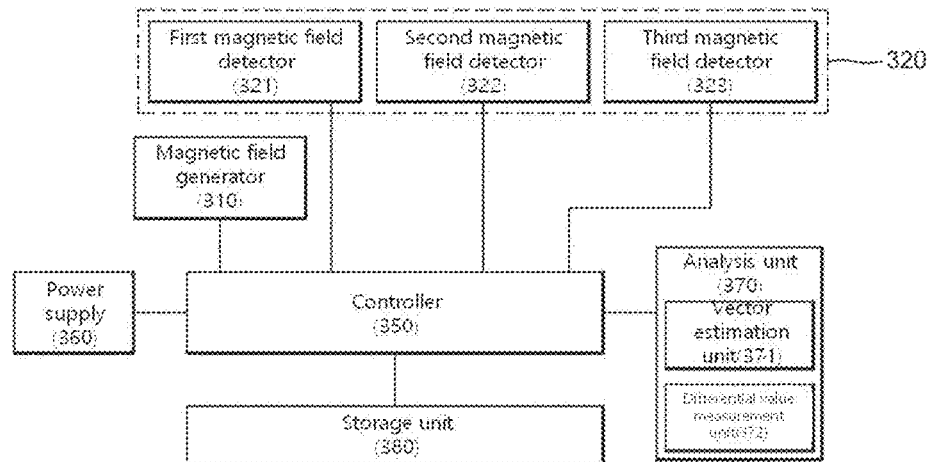

FIG. 7 shows an airship-based electromagnetic survey apparatus (a) according to a fifth embodiment of the present invention and an analyzer (b) of the same.

Referring to FIG. 7(a), a transmission coil 210 is disposed along a circumference of an envelope 110 of an airship 100 in a horizontal axis direction of the envelope 110. In addition, as reception coils 220, a first vertical coil 221 and a second vertical coil 222 are disposed at a distance from each other along the circumference of the envelope 110 in a vertical axis direction of the envelope, and, as a third reception coil 220, a horizontal coil 223 is disposed along the circumference of the envelope 110 in the horizontal axis direction. Each of the transmission coil 210 and the reception coil 220 is connected to the analyzer 300 disposed in the gondola 130 through a signal cable. Although the horizontal coil 221 is shown as being placed between the two vertical coils at an upper portion of the envelope 110, it should be understood that the present invention is not limited thereto and the horizontal coil is not necessarily placed between the two vertical coils at the upper portion of the envelope 110.

Since details of the transmission coil 210 are described above, the detailed description thereof will be omitted. The airship-based electromagnetic survey apparatus according to this embodiment is different from the above embodiments in that, as a reception coil 220, the first vertical coil 221 and the second vertical coil 222 are disposed at a distance from each other along a circumference of the envelope 110 in the vertical axis direction, and, as another reception coil 220, the horizontal coil 223 is disposed along a circumference of the envelope 110 in the horizontal axis direction so as to detect a horizontal magnetic field that can have different measurements and a vertical magnetic field at the same time.

Referring to FIG. 7(b), the analyzer 300 includes a magnetic field generator 310 generating a primary magnetic field by applying an alternating current to the transmission coil 210; first and second magnetic field detectors 321, 322, as the magnetic field detector 320 detecting a secondary magnetic field from the first vertical coil 221 and the second vertical coil 222, which are the reception coil 221; and a third magnetic field detector 323, as the magnetic field detector 320 detecting a secondary magnetic field from the horizontal coil 223, which is the reception coil 221. A power supply 360 serves to supply an alternating current to the transmission coil 210 while supplying electric power for device operation.

Thus, the magnetic field generator 310 allows an alternating current to flow through the transmission coil 210 facing the ground to generate a primary magnetic field, and the first and second magnetic field detectors 321, 322 and the third magnetic field detector 323 detect a secondary magnetic field created by an eddy current generated under the ground due to the primary magnetic field through the first and second vertical coils 221, 222 and the horizontal coil 223, which are the reception coil 220, respectively.

The detected secondary magnetic field is transferred to an analysis unit 370, and the analysis unit 370 analyzes the secondary magnetic field transferred from the first, second, and third magnetic field detectors 321, 322, 323 to perform an underground survey including measurement of electrical resistivity of the ground.

Since the first vertical coil 221 and the second vertical coil 222, which are the reception coil 220, are spaced apart from each other, differential measurement of a horizontal component of a magnetic field is possible. Thus, in the fifth embodiment, a differential value measurement unit 372 of the analysis unit 370 analyzes a difference between measurements of a horizontal component of the secondary magnetic field detected by the first vertical coil 221 and the second vertical coil 222, such that a response of conductors buried at shallow depth to the primary magnetic field can be analyzed.

In addition, since the horizontal coil 223 and the first and/or second vertical coils 221, 223 are disposed in a direction parallel to the ground and in a direction perpendicular to the ground, respectively, to detect a vertical secondary magnetic field and a horizontal secondary magnetic field at the same time, it is possible to estimate a vector of the secondary magnetic field based on measurements of vertical and horizontal components of the detected magnetic field.

Results of analyzing vertical and horizontal components of the secondary magnetic field generated by underground conductors by the analysis unit 370, results of analyzing a response of conductors buried at shallow depth, and results of estimating a vector of the secondary magnetic field are stored in a storage unit 380.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention. Therefore, the scope of the invention should be limited only by the accompanying claims and equivalents thereof.

The invention claimed is:

1. An airship-based electromagnetic survey apparatus provided to an airship having an envelope, the airship-based electromagnetic survey apparatus comprising:

a transmission coil disposed along a circumference of the envelope in a horizontal axis direction of the envelope and generating a primary magnetic field;

at least one reception coil disposed along the circumference of the envelope and detecting a secondary magnetic field induced by the primary magnetic field; and an analyzer performing an airborne electromagnetic survey by applying electric current to the reception coil and analyzing measurements of the secondary magnetic field detected by the reception coil.

2. The airship-based electromagnetic survey apparatus according to claim 1, wherein the analyzer comprises a magnetic field generator generating the primary magnetic field by applying an alternating current to the transmission coil; a magnetic field detector detecting the secondary magnetic field from the reception coil; an analysis unit measuring and analyzing the secondary magnetic field transferred from the magnetic field detector; and a storage unit storing analysis results of the analysis unit.

3. The airship-based electromagnetic survey apparatus according to claim 2, wherein the reception coil comprises a horizontal coil disposed along the circumference of the envelope in the horizontal axis direction and measuring a vertical component of the secondary magnetic field.

4. The airship-based electromagnetic survey apparatus according to claim 2, wherein the reception coil comprises a vertical coil disposed along the circumference of the envelope in a vertical axis direction of the envelope and measuring a horizontal component of the secondary magnetic field.

5. The airship-based electromagnetic survey apparatus according to claim 4, wherein the vertical coil comprises a first vertical coil and a second vertical coil disposed at a distance from each other along the circumference of the envelope in the vertical axis direction: the magnetic field detector comprises a first magnetic field detector and a second magnetic field detector detecting the secondary magnetic field from the first vertical coil and the second vertical coil, respectively; and the analysis unit analyzes a difference between measurements of the secondary magnetic field detected by the first magnetic field detector and the second magnetic field detector to survey a response of conductors buried at shallow depth.

6. The airship-based electromagnetic survey apparatus according to claim 2, wherein the reception coil comprises a horizontal coil disposed along the circumference of the envelope in the horizontal axis direction and measuring a vertical component of the secondary magnetic field and a vertical coil disposed along the circumference of the envelope in a vertical axis direction of the envelope and measuring a horizontal component of the secondary magnetic field; the magnetic field detector comprises a third magnetic field detector and a first magnetic field detector detecting the secondary magnetic field from the horizontal coil and the vertical coil, respectively; and the analysis unit estimates a vector of the secondary magnetic field based on measurements of the secondary magnetic field detected by the third magnetic field detector and the first magnetic field detector.

7. The airship-based electromagnetic survey apparatus according to claim 2, wherein the reception coil comprises a horizontal coil disposed along the circumference of the envelope in the horizontal axis direction and measuring a vertical component of the secondary magnetic field; and a first vertical coil and a second vertical coil disposed at a distance from each other along the circumference of the envelope in a vertical axis direction of the envelope, the magnetic field detector comprises: a third magnetic field detector detecting the secondary magnetic field from the horizontal coil; and a first magnetic field detector and a second magnetic field detector detecting the secondary magnetic field from the first vertical coil and the second vertical coil, respectively, and the analysis unit estimates a vector of the secondary magnetic field based on measurements of the secondary magnetic field detected by the first, second, and third magnetic field detectors and analyzes a difference between measurements of the secondary magnetic field detected by the first magnetic field detector and the second magnetic field detector to survey a response of conductors buried at shallow depth.

\* \* \* \* \*